United States Patent
Woo et al.

(10) Patent No.: US 10,886,550 B2
(45) Date of Patent: Jan. 5, 2021

(54) MEMBRANE ELECTRODE ASSEMBLY

(71) Applicants: HYUNDAI MOTOR COMPANY, Seoul (KR); KIA MOTORS CORPORATION, Seoul (KR)

(72) Inventors: Hee Jin Woo, Suwon-Si (KR); Ki Sub Lee, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 97 days.

(21) Appl. No.: 16/212,275

(22) Filed: Dec. 6, 2018

(65) Prior Publication Data

US 2020/0075982 A1    Mar. 5, 2020

(30) Foreign Application Priority Data

Sep. 4, 2018  (KR) .................. 10-2018-0105546

(51) Int. Cl.
  *H01M 8/1004* (2016.01)
  *H01M 8/0258* (2016.01)
  *H01M 8/0273* (2016.01)
  *H01M 8/242* (2016.01)

(52) U.S. Cl.
  CPC ....... *H01M 8/1004* (2013.01); *H01M 8/0258* (2013.01); *H01M 8/0273* (2013.01); *H01M 8/242* (2013.01)

(58) Field of Classification Search
  None
  See application file for complete search history.

(56) References Cited

U.S. PATENT DOCUMENTS

| | | | | |
|---|---|---|---|---|
| 4,732,822 A | * | 3/1988 | Wright | H01M 8/04283 429/451 |
| 4,942,099 A | * | 7/1990 | Isobe | H01M 8/0271 429/460 |
| 8,298,697 B2 | * | 10/2012 | Unoki | H01M 8/0273 429/100 |
| 8,790,843 B2 | | 7/2014 | Na et al. | |
| 2005/0084734 A1 | * | 4/2005 | Kobayashi | H01M 8/1004 429/480 |
| 2009/0286121 A1 | * | 11/2009 | Morimoto | H01M 8/242 429/494 |
| 2012/0301810 A1 | * | 11/2012 | Kawajiri | H01M 8/0265 429/482 |

FOREIGN PATENT DOCUMENTS

| | | |
|---|---|---|
| JP | 2013-025928 A | 2/2013 |
| JP | 2016-139529 A | 8/2016 |
| KR | 10-2012-0078393 A | 7/2012 |

* cited by examiner

*Primary Examiner* — Rena Dye Cronin

(74) *Attorney, Agent, or Firm* — Morgan, Lewis & Bockius LLP

(57) ABSTRACT

A membrane electrode assembly includes: an electrolyte membrane; a catalyst electrode layer including a cathode catalyst electrode disposed on the electrolyte membrane and an anode catalyst electrode disposed under the electrolyte membrane; and a sub-gasket disposed on the electrolyte membrane to be in contact with an edge of the catalyst electrode layer. Each of the sub-gasket includes a moisture drain hole penetrating the sub-gasket to expose a portion of the electrolyte membrane outside.

9 Claims, 4 Drawing Sheets

A-A'

[FIG. 1]
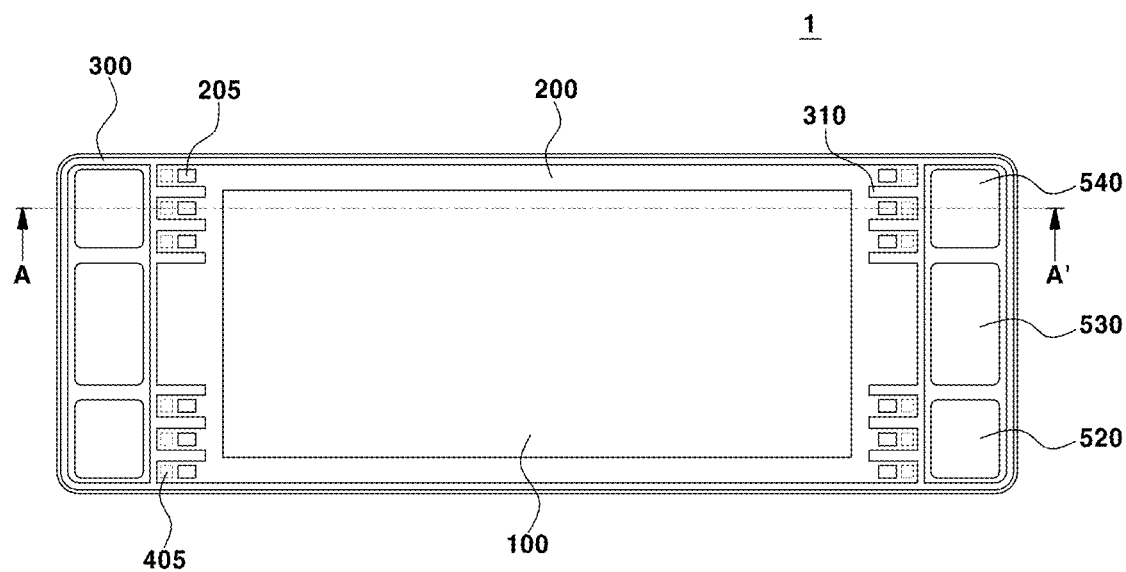

[FIG. 2]
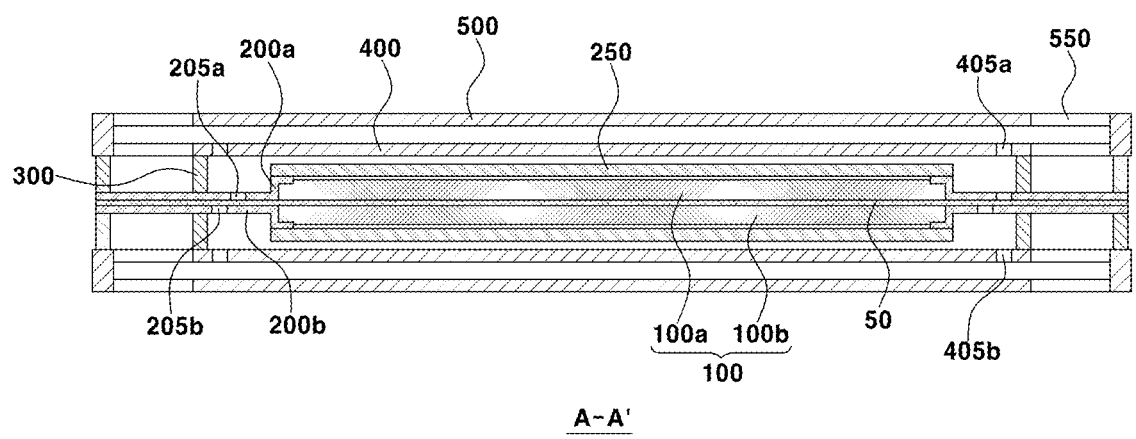
A-A'

[FIG. 3]
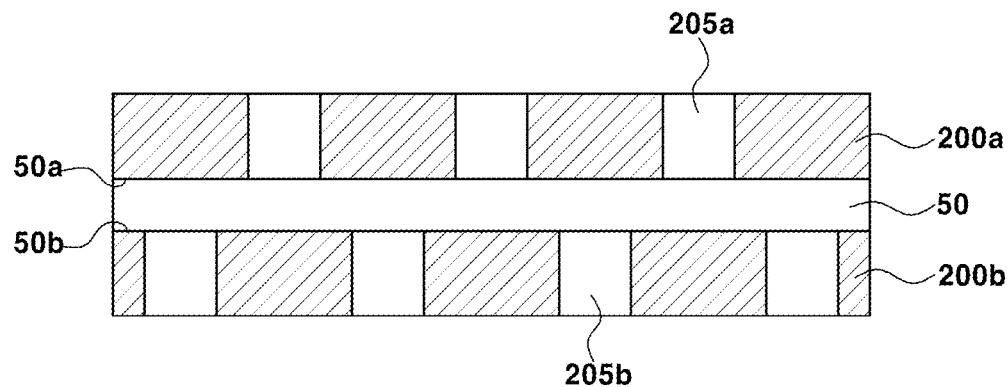
[FIG. 4]
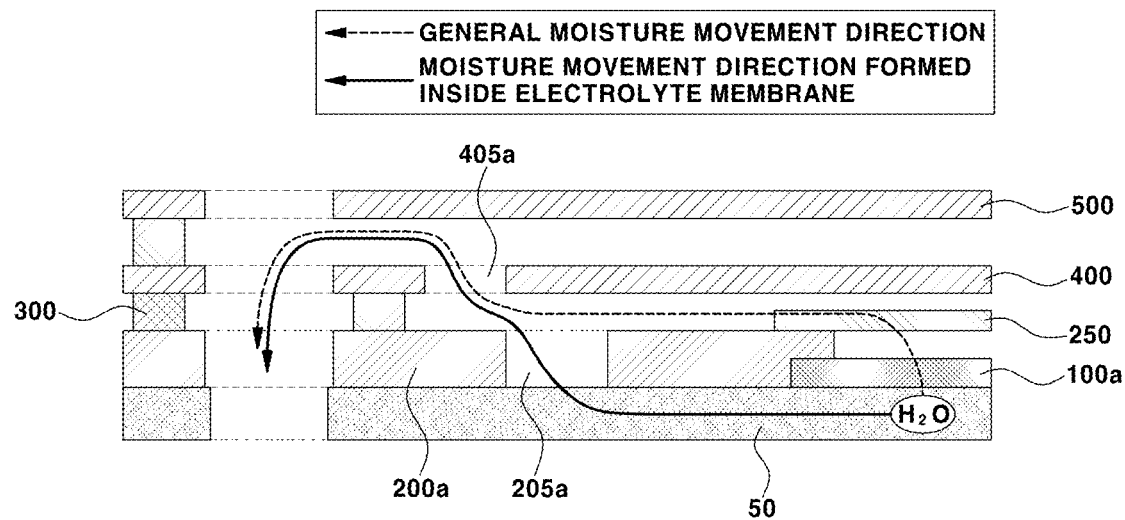

[FIG. 5]
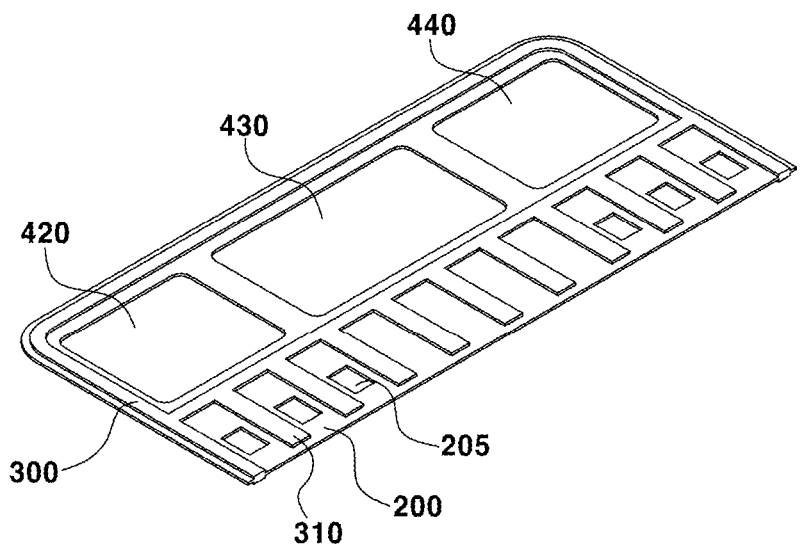
[FIG. 6]
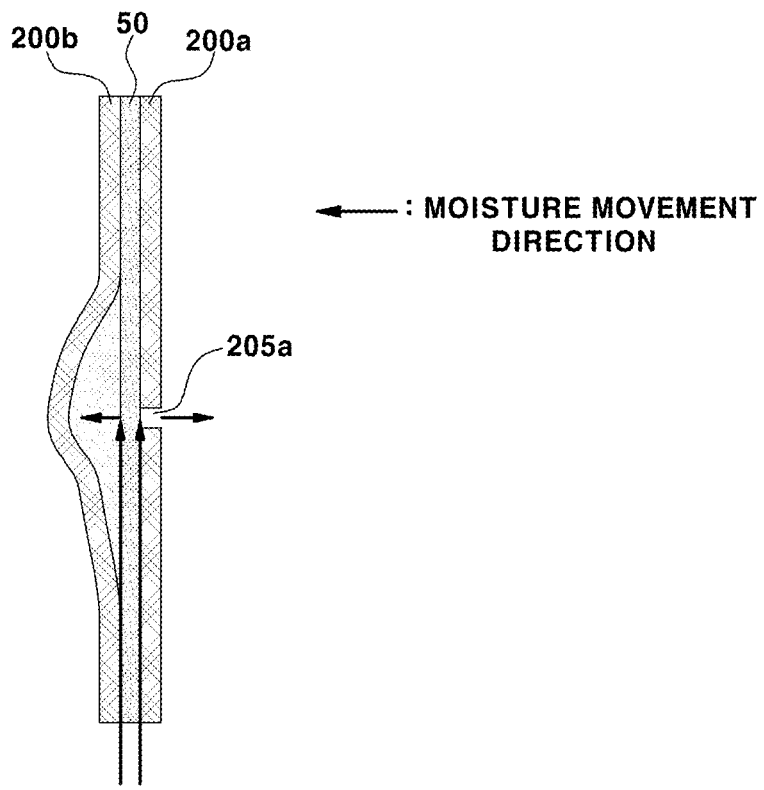

MEMBRANE ELECTRODE ASSEMBLY

CROSS-REFERENCE TO RELATED APPLICATION

This application claims under 35 U.S.C. § 119(a) the benefit of priority to Korean Patent Application No. 10-2018-0105546 filed on Sep. 4, 2018, the entire contents of which are incorporated herein by reference.

TECHNICAL FIELD

The present disclosure relates to a membrane electrode assembly. More particularly, the present disclosure relates to a membrane electrode assembly including a moisture drain hole for removing moisture generated in an electrolyte membrane.

BACKGROUND

A fuel cell is an electrochemical device that generates electricity through chemical reaction between hydrogen and oxygen, which are reactants. A polymer electrolyte membrane fuel cell (PEMFC), which uses a polymer membrane allowing permeation of hydrogen ions as an electrolyte, is a high-output fuel cell having a higher current density than other fuel cells. The PEMFC can be driven at a temperature of 100° C. or lower and has a simple structure. In addition, the PEMFC is applicable to various fields such as, for example, power sources of zero-emission vehicles, distributed on-site power generation facilities, power sources for military use, power sources for spacecraft, and the like. The PEMFC is similar to a battery in that it generates electricity through chemical reaction. However, unlike a battery, since the fuel cell receives hydrogen and oxygen, which are reaction materials, from the outside, it does not require charging and can continuously generate electricity as long as fuel is supplied thereto. In addition, unlike conventional internal combustion engines, since the fuel cell generates energy without a fuel combustion reaction, there is no emission of toxic pollutants such as sulfur or nitrogen oxide, and the emission of carbon dioxide is dramatically reduced. Therefore, a fuel cell has recently received increased attention as a low-pollution and high-efficiency next-generation energy source.

However, moisture may be generated in an electrolyte membrane during electrochemical reaction, which may deteriorate the performance of the fuel cell. Generally, moisture is discharged through a gas diffusion layer disposed on and under a catalyst electrode layer, but moisture generated inside the electrolyte membrane accumulates on the surface of the electrolyte membrane.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide a membrane electrode assembly including a moisture drain hole for discharging moisture that accumulates between an electrolyte membrane and a sub-gasket.

In one aspect, the present disclosure provides a membrane electrode assembly including: an electrolyte membrane; a catalyst electrode layer including a cathode catalyst electrode disposed on the electrolyte membrane and an anode catalyst electrode disposed under the electrolyte membrane; and a sub-gasket disposed on and under the electrolyte membrane to be in contact with the edge of the catalyst electrode layer, wherein the sub-gasket includes a moisture drain hole penetrating the sub-gasket to expose a portion of the electrolyte membrane outside.

The moisture drain hole may be disposed so as to be spaced apart from the edge of the catalyst electrode layer.

The membrane electrode assembly may further include an upper separator and a lower separator disposed on and under the sub-gasket, respectively. Each of the upper separator and the lower separator may be provided with a separator gas discharge hole, and the separator gas discharge hole may be disposed more distant from the catalyst electrode layer than the moisture drain hole.

The sub-gasket may include an upper sub-gasket disposed on the electrolyte membrane and a lower sub-gasket disposed under the electrolyte membrane. The moisture drain hole may include an upper moisture drain hole formed in the upper sub-gasket and a lower moisture drain hole formed in the lower sub-gasket. Each of the upper moisture drain hole and the lower moisture drain hole may be provided in a plural number.

The upper moisture drain hole and the lower moisture drain hole may be arranged so as not to overlap each other vertically.

The upper moisture drain hole and the lower moisture drain hole may be arranged asymmetrically.

The upper moisture drain hole and the lower moisture drain hole may be arranged alternately on and under the electrolyte membrane in a direction in which the electrolyte membrane extends.

The membrane electrode assembly may further include a main gasket and a separator sequentially disposed on the sub-gasket. The main gasket may include a plurality of gasket protrusions extending toward the catalyst electrode layer. The gasket protrusions may extend in a direction perpendicular to the direction from the main gasket to the separator.

The moisture drain hole may be disposed between adjacent ones of the gasket protrusions.

The membrane electrode assembly may further include a current collector provided on the separator. The current collector may include an oxygen manifold, a hydrogen manifold and a coolant manifold. When viewed in plan, the moisture drain hole may be disposed between the oxygen manifold and the catalyst electrode layer and between the hydrogen manifold and the catalyst electrode layer.

Other aspects and embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is a plan view illustrating a membrane electrode assembly according to an embodiment of the present disclosure;

FIG. 2 is a cross-sectional view taken along line A-A' in FIG. 1;

FIG. 3 is a view illustrating a moisture drain hole according to an embodiment of the present disclosure;

FIG. 4 is a view showing a path along which moisture is discharged through the moisture drain hole according to an embodiment of the present disclosure;

FIG. 5 is a view illustrating a main gasket according to an embodiment of the present disclosure; and FIG. 6 is a view showing the principle of discharge of moisture through the moisture drain hole according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Advantages and features of the present disclosure and methods for achieving them will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. The same reference numerals used throughout the specification refer to the same constituent elements.

Exemplary embodiments in the specification will be described with reference to cross-sectional views and/or plan views, which are ideal exemplary views of the present disclosure. In the drawings, the thickness of films and areas may be exaggerated to effectively explain technical contents. Thus, the shapes shown in the drawings may be changed by manufacturing technology and/or allowable errors. Therefore, the exemplary embodiments of the present disclosure are not limited to the specific shapes shown in the drawings, but include variations in shape depending on a manufacturing process. For example, an etching area illustrated as having a right angle may be rounded, or may have a predetermined curvature. Thus, the areas exemplarily illustrated in the drawings have schematic properties, and the shapes of the areas shown in the drawings are merely to illustrate specific shapes of elements but not to limit the scope of the present disclosure.

FIG. 1 is a plan view illustrating a membrane electrode assembly according to an embodiment of the present disclosure, and FIG. 2 is a cross-sectional view taken along line A-A' in FIG. 1

Referring to FIGS. 1 and 2, a membrane electrode assembly 1 may include an electrolyte membrane 50, a catalyst electrode layer 100, a sub-gasket 200, a main gasket 300, a separator 400, and a current collector 500. The membrane electrode assembly 1 according to an embodiment of the present disclosure may be a polymer electrolyte membrane fuel cell (PEMFC), which uses a polymer membrane allowing permeation of hydrogen ions as an electrolyte. The membrane electrode assembly 1 may generate electric energy through electrochemical reaction between hydrogen and oxygen.

The electrolyte membrane 50 may be a polymer electrolyte membrane, which allows only hydrogen ions to permeate. The electrolyte membrane 50 may serve both as an electron-blocking membrane and as a hydrogen ion conductor within the fuel cell.

The catalyst electrode layer 100 may be disposed on and under the electrolyte membrane 50. The catalyst electrode layer 100 may include a cathode catalyst electrode 100a disposed on the electrolyte membrane 50 and an anode catalyst electrode 100b disposed under the electrolyte membrane 50. The anode catalyst electrode 100b may decompose hydrogen, which is a fuel, into electrons and hydrogen ions through oxidation reaction. The decomposed hydrogen ions may be moved to the cathode catalyst electrode 100a by the electrolyte membrane 50. The cathode catalyst electrode 100a may function to generate moisture and heat through a reduction reaction between the electrons and hydrogen ions, transferred from the anode catalyst electrode 100b, and oxygen.

The sub-gasket 200 may include an upper sub-gasket 200a disposed on the electrolyte membrane 50 and a lower sub-gasket 200b disposed under the electrolyte membrane 50. For example, the sub-gasket 200 may be made of a polymer material, such as polyethylene terephthalate (PET), polyethylene naphthalate (PEN), polyimide (PI) or polypropylene (PP), and/or a material coated with the polymer material. The sub-gasket 200 may be disposed so as to be in contact with the edge of the catalyst electrode layer 100 and to expose the catalyst electrode layer 100 to the outside. That is, a portion of the upper sub-gasket 200a may be in contact with the edge portion of the top surface of the cathode catalyst electrode 100a, and a portion of the lower sub-gasket 200b may be in contact with the edge portion of the top surface of the anode catalyst electrode 100b. When viewed in plan, the sub-gasket 200 may be disposed so as to surround the catalyst electrode layer 100.

The sub-gasket 200 may be provided with a moisture drain hole 205. The moisture drain hole 205 may penetrate the sub-gasket 200, and the electrolyte membrane 50 may be exposed through the moisture drain hole 205. The moisture drain hole 205 may be disposed so as to be spaced apart from the edge of the catalyst electrode layer 100. The moisture drain hole 205 may discharge moisture generated in the electrolyte membrane 50 during electrochemical reaction. The moisture generated in the electrolyte membrane 50 is generally discharged to the outside through a gas diffusion layer 250 from the upper side of the catalyst electrode layer 100. However, the moisture may move within the electrolyte membrane 50, which is hydrophilic, in the direction in which the electrolyte membrane 50 extends. If the moisture moves horizontally within the electrolyte membrane 50, the moisture may permeate to a portion covered with the sub-gasket 200. Furthermore, if a gap is present between the sub-gasket 200 and the electrolyte membrane 50, the moisture may be introduced into and collected in the gap. Accordingly, a swelling phenomenon may occur between the sub-gasket 200 and the electrolyte membrane 50 due to accumulation of water, which may lower the interface bonding force between the sub-gasket 200 and the electrolyte membrane 50. In addition, bubbles, which swell due to the swelling phenomenon, may inhibit the smooth inflow and outflow of oxygen and hydrogen, which may deteriorate the performance of the fuel cell. Therefore, according to an embodiment of the present disclosure, the moisture drain hole 205 penetrates the sub-gasket 200 and serves to discharge moisture present between the sub-gasket 200 and the electrolyte membrane 50 to the outside.

The moisture drain hole 205 may include an upper moisture drain hole 205a formed in the upper sub-gasket 200a and a lower moisture drain hole 205b formed in the lower sub-gasket 200b. Each of the upper moisture drain hole 205a and the lower moisture drain hole 205b may be provided in a plural number. The upper moisture drain hole 205a and the lower moisture drain hole 205b may be arranged such that they do not overlap each other vertically.

The gas diffusion layer 250 may be disposed on the cathode catalyst electrode 100a and on the anode catalyst electrode 100b. The gas diffusion layer 250 may be in contact with the sub-gasket 200 provided on the cathode catalyst electrode 100a and the anode catalyst electrode 100b. The gas diffusion layer 250 may be disposed on the sub-gasket 200 so as to avoid directly contacting the catalyst electrode layer 100. The gas diffusion layer 250 may be formed of a porous medium having high porosity so as to allow the reaction gas and the generated moisture to easily pass therethrough. For example, the gas diffusion layer 250 may be made of a carbon fiber and a polytetrafluoroethylene (PTFE)-based hydrophobic material.

The main gasket 300 may be disposed between the sub-gasket 200 and the separator 400 in order to support the separator 400. The main gasket 300 may include a plurality of gasket protrusions 310, which extends toward the catalyst electrode layer 100. The gasket protrusions 310 may extend in a direction perpendicular to the direction from the main gasket 300 to the separator 400. When viewed in plan (refer to FIG. 1), the moisture drain hole 205 may be disposed between two adjacent ones of the gasket protrusions 310. That is, a plurality of moisture drain holes 205 may be disposed between a plurality of gasket protrusions 310. In addition, a separator gas discharge hole 405 may be disposed between two adjacent ones of the gasket protrusions 310. The separator gas discharge hole 405 may be disposed between the moisture drain hole 205 and the main gasket 300. That is, the moisture drain hole 205 may be disposed closer to the catalyst electrode layer 100 than the separator gas discharge hole 405. That is, the separator gas discharge hole 405 may be disposed more distant from the catalyst electrode layer 100 than the moisture drain hole 205. The moisture drain hole 205 may be disposed adjacent to the separator gas discharge hole 405.

The separator 400 may provide a flow path, through which fuel or air flows, in order to supply fuel or air to the catalyst electrode layer 100 and the electrolyte membrane 50. In addition, the separator 400 may serve to discharge a product, such as water generated after the electrochemical reaction, to the outside. The separator 400 may be disposed on the gas diffusion layer 250, and may be provided on each of the upper sub-gasket 200a and the lower sub-gasket 200b. The separator 400 may have a separator gas discharge hole 405 so that fuel or air may be introduced or discharged therethrough. The separator gas discharge hole 405 may include an upper separator gas discharge hole 405a disposed on the upper sub-gasket 200a and a lower separator gas discharge hole 405b disposed on the lower sub-gasket 200b. The separator gas discharge hole 405 may be disposed between two adjacent ones of the gasket protrusions 310.

The current collector 500 may be disposed on the separator 400. The current collector 500 may be provided on each of the upper sub-gasket 200a and the lower sub-gasket 200b. The current collector 500 may have a manifold 550 in order to supply fuel or air to the catalyst electrode layer 100 and the electrolyte membrane 50. The manifold 550 may include an oxygen manifold 520, through which oxygen is supplied, a coolant manifold 530, through which coolant is supplied, and a hydrogen manifold 540, through which hydrogen is supplied. The oxygen manifold 520, the coolant manifold 530 and the hydrogen manifold 540 may be spaced apart from each other, and may be spaced apart from the catalyst electrode layer 100 when viewed in plan. Further, when viewed in plan, the oxygen manifold 520, the coolant manifold 530 and the hydrogen manifold 540 may be disposed in a direction perpendicular to the direction in which the gasket protrusions 310 extend. Furthermore, when viewed in plan, the moisture drain hole 205 may be disposed between the oxygen manifold 520 and the catalyst electrode layer 100 and between the hydrogen manifold 540 and the catalyst electrode layer 100. However, the moisture drain hole 205 may not be disposed between the coolant manifold 530 and the catalyst electrode layer 100.

According to an embodiment of the present disclosure, the moisture drain hole 205 may be disposed adjacent to the separator gas discharge hole 405 so that moisture may be easily discharged through the separator gas discharge hole 405 formed in the separator 400. In addition, since the moisture drain hole 205 penetrates the sub-gasket 200 so as to expose the electrolyte membrane 50, it is possible to prevent moisture, which flows through the pores in the electrolyte membrane 50, from accumulating in a specific region. That is, due to the moisture drain hole 205, it is possible to prevent the generation of water bubbles between the electrolyte membrane 50 and the sub-gasket 200. In addition, since the moisture drain hole 205 is formed in each of the upper sub-gasket 200a and the lower sub-gasket 200b, the moisture generated in the upper and lower sides of the electrolyte membrane 50 may be smoothly discharged. Thus, the performance and durability of the fuel cell may be improved.

FIG. 3 is a view illustrating the moisture drain hole according to an embodiment of the present disclosure.

Referring to FIG. 3, the moisture drain hole 205 may include an upper moisture drain hole 205a for exposing the top surface 50a of the electrolyte membrane 50 and a lower moisture drain hole 205b for exposing the bottom surface 50b of the electrolyte membrane 50. The upper moisture drain hole 205a may discharge moisture that accumulates between the top surface 50a of the electrolyte membrane 50 and the upper sub-gasket 200a, and the lower moisture drain hole 205b may discharge moisture that accumulates between the bottom surface 50b of the electrolyte membrane 50 and the lower sub-gasket 200b. The cross-section of each of the moisture drain holes 205a and 205b may have any of various shapes, such as a rectangle, a circle, a triangle, etc.

The upper moisture drain hole 205a and the lower moisture drain hole 205b may be disposed at the upper and lower sides of the electrolyte membrane 50, respectively, and may be arranged asymmetrically. For example, the upper moisture drain hole 205a and the lower moisture drain hole 205b may be arranged such that they do not overlap each other vertically. That is, the upper moisture drain hole 205a and the lower moisture drain hole 205b may be arranged alternately in a transverse direction. The transverse direction is a direction perpendicular to the direction from the upper sub-gasket 200a to the lower sub-gasket 200b. Since the upper moisture drain hole 205a and the lower moisture drain hole 205b are arranged asymmetrically, the path along which moisture generated in the top surface 50a of the electrolyte membrane 50 flows and the path along which moisture generated in the bottom surface 50b of the electrolyte membrane 50 flows are different from each other, thereby more efficiently discharging moisture. In addition, since the upper moisture drain hole 205a and the lower moisture drain hole 205b are arranged asymmetrically, it is possible to prevent the inflow and outflow of gas through the exposed electrolyte membrane 50. If the upper moisture drain hole 205a and the lower moisture drain hole 205b are arranged so as to overlap vertically, moisture may be discharged through any one of the upper moisture drain hole 205a and the lower moisture drain hole 205b, but may not be discharged through the remaining moisture drain hole. In this case, gas may be introduced through the moisture drain hole through which moisture is not discharged. However, according to an embodiment of the present disclosure, the upper moisture drain hole 205a and the lower moisture drain hole 205b are arranged asymmetrically such that they do not overlap each other vertically, thereby preventing the introduction of gas through any of the moisture drain holes.

FIG. 4 is a view showing the path along which moisture is discharged through the moisture drain hole according to an embodiment of the present disclosure. For convenience of explanation, the moisture discharge path, which is defined by the components disposed on the electrolyte membrane 50, will be described with reference to FIG. 4. The moisture discharge path defined by the components disposed under the electrolyte membrane 50 may be similar to the moisture discharge path defined by the components disposed on the electrolyte membrane 50.

Referring to FIG. 4, moisture may be generated by electrochemical reaction in the electrolyte membrane 50. Generally, the moisture generated in the electrolyte membrane 50 may move to the upper separator gas discharge hole 405a through the gas diffusion layer 250, and may then be discharged to the outside. However, a portion of the moisture generated in the electrolyte membrane 50 moves horizontally within the electrolyte membrane 50, and moves to the portion where the upper sub-gasket 200a and the electrolyte membrane 50 are in contact with each other. The moisture may move to the upper separator gas discharge hole 405a through the upper moisture drain hole 205a formed in the upper sub-gasket 200a, and may then be discharged. Here, in order to facilitate discharge of the moisture, the upper moisture drain hole 205a and the upper separator gas discharge hole 405a may be disposed adjacent to each other.

FIG. 5 is a view illustrating a main gasket according to an embodiment of the present disclosure.

Referring to FIGS. 2 and 5, the main gasket 300 may include passages 420, 430 and 440, through which oxygen, coolant and hydrogen, introduced respectively through the oxygen manifold 520, the coolant manifold 530 and the hydrogen manifold 540 formed in the current collector 500, move. The passages 420, 430 and 440 may include a first passage 420, through which oxygen moves, a second passage 430, through which coolant moves, and a third passage 440, through which hydrogen moves.

The main gasket 300 may include a gasket protrusion 310 extending in one direction. The gasket protrusions 310 may be provided in a plural number, and the moisture drain hole 205 may be selectively disposed between two adjacent ones of the gasket protrusions 310. The moisture drain hole 205 may be formed so as to penetrate the sub-gasket 200. Here, the moisture drain hole 205 may be disposed in the space defined by two gasket protrusions 310.

The moisture drain hole 205 may be disposed in the space defined by the gasket protrusions 310 disposed adjacent to the first passage 420 and the third passage 440. The moisture drain hole 205 may not be disposed between the gasket protrusions 310 extending in one direction from the second passage 430.

FIG. 6 is a view showing the principle of discharge of moisture through the moisture drain hole according to an embodiment of the present disclosure.

Referring to FIG. 6, the moisture generated in the electrolyte membrane 50 through electrochemical reaction may move within the electrolyte membrane 50 and may permeate to the portions that are in contact with the sub-gaskets 200a and 200b. If a gap is present between the sub-gaskets 200a and 200b and the electrolyte membrane 50, moisture may be introduced into and accumulate in the gap. Accordingly, the interface bonding force between the sub-gaskets 200a and 200b and the electrolyte membrane 50 may be weakened by a swelling phenomenon attributable to accumulation of water. Further, bubbles, which swell due to the swelling phenomenon, may inhibit the smooth inflow and outflow of oxygen and hydrogen, which may deteriorate the performance of the membrane electrode assembly.

According to an embodiment of the present disclosure, moisture may be concentrated at the moisture drain hole 205a, in which a flow path is formed, by the diffusion principle. The moisture flowing out of the membrane electrode assembly through the moisture drain hole 205a may move to the adjacent separator gas discharge hole 405a (refer to FIG. 2), and may be stably discharged to the outside. The swelling phenomenon, which is caused by accumulation of water between the electrolyte membrane 50 and the sub-gaskets 200a and 200b, may be prevented by the moisture drain hole 205a exposing the electrolyte membrane 50, and oxygen and hydrogen may smoothly flow into or out of the membrane electrode assembly, thereby improving the performance and durability of the fuel cell.

As is apparent from the above description, the present disclosure has the following effects.

It is possible to prevent water bubbles from being generated between an electrolyte membrane and a sub-gasket and to discharge moisture generated inside the electrolyte membrane or on the surface of the electrolyte membrane to the outside through a moisture drain hole formed so as to expose the electrolyte membrane. As a result, the performance and durability of the fuel cell may be improved.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A membrane electrode assembly comprising:
an electrolyte membrane;
a catalyst electrode layer comprising:
   a cathode catalyst electrode disposed on the electrolyte membrane; and
   an anode catalyst electrode disposed under the electrolyte membrane; and
a sub-gasket disposed on the electrolyte membrane to be in contact with an edge of the catalyst electrode layer,
wherein the sub-gasket comprises a moisture drain hole penetrating the sub-gasket to expose a portion of the electrolyte membrane outside,
wherein the sub-gasket includes:
   an upper sub-gasket disposed on an upper surface of the electrolyte membrane; and
   a lower sub-gasket disposed on a lower surface of the electrolyte membrane, wherein the moisture drain hole includes:
an upper moisture drain hole in the upper sub-gasket; and
a lower moisture drain hole in the lower sub-gasket, and
wherein each of the upper moisture drain hole and the lower moisture drain hole is provided in plural.

2. The membrane electrode assembly of claim 1, wherein the moisture drain hole is spaced apart from the edge of the catalyst electrode layer.

3. The membrane electrode assembly of claim 1, further comprising an upper separator and a lower separator arranged to be above and below the sub-gasket, respectively,
wherein each of the upper separator and the lower separator includes a separator gas discharge hole, and
wherein the separator gas discharge hole is located farther from the catalyst electrode layer than the moisture drain hole.

4. The membrane electrode assembly of claim 1, wherein the upper moisture drain hole and the lower moisture drain hole are arranged alternately in a transverse direction.

5. The membrane electrode assembly of claim 1, wherein the upper moisture drain hole and the lower moisture drain hole are arranged asymmetrically.

6. The membrane electrode assembly of claim 1, wherein the upper moisture drain hole and the lower moisture drain hole are arranged alternately on and under the electrolyte membrane in a direction in which the electrolyte membrane extends.

7. The membrane electrode assembly of claim 1, further comprising a main gasket and a separator sequentially disposed on the sub-gasket,
wherein the main gasket comprises a plurality of gasket protrusions extending toward the catalyst electrode layer, and
wherein the plurality of gasket protrusions extend in a direction perpendicular to a direction from the main gasket to the separator.

8. The membrane electrode assembly of claim 7, wherein the moisture drain hole is arranged between the gasket protrusions.

9. The membrane electrode assembly of claim 7, further comprising a current collector disposed on the separator,
wherein the current collector includes an oxygen manifold, a hydrogen manifold and a coolant manifold, and
wherein, when viewed in plan, the moisture drain hole is arranged between the oxygen manifold and the catalyst electrode layer and between the hydrogen manifold and the catalyst electrode layer.

\* \* \* \* \*